United States Patent
Chen et al.

(10) Patent No.: US 9,130,738 B2
(45) Date of Patent: Sep. 8, 2015

(54) SEQUENCE SYNCHRONIZATION APPARATUS AND METHOD AND RECEIVER

(71) Applicant: Fujitsu Limited, Kawasaki (JP)

(72) Inventors: Hao Chen, Beijing (CN); Lei Li, Beijing (CN); Weizhen Yan, Beijing (CN); Bo Liu, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/510,578

(22) Filed: Oct. 9, 2014

(65) Prior Publication Data
US 2015/0103963 A1  Apr. 16, 2015

(30) Foreign Application Priority Data
Oct. 10, 2013 (CN) .......................... 2013 1 0469795

(51) Int. Cl.
*H04L 7/00* (2006.01)
*H04L 7/04* (2006.01)

(52) U.S. Cl.
CPC ....................................... *H04L 7/041* (2013.01)

(58) Field of Classification Search
CPC ................... H04B 1/7075; H04B 2201/70701; H04B 1/70755; H04B 1/7183; H04L 27/206; H04W 52/325; H04J 13/004; H04J 3/06
USPC .......................................................... 375/368
See application file for complete search history.

(56) References Cited

U.S. PATENT DOCUMENTS

| | | | |
|---|---|---|---|
| 6,580,930 B1* | 6/2003 | Fulghum et al. | 455/574 |
| 2002/0122407 A1* | 9/2002 | Molnar et al. | 370/347 |
| 2005/0249270 A1* | 11/2005 | Matsui et al. | 375/149 |
| 2006/0061691 A1* | 3/2006 | Rabinowitz et al. | 348/625 |
| 2006/0233225 A1* | 10/2006 | Omoto | 375/149 |

* cited by examiner

*Primary Examiner* — Don N Vo
(74) *Attorney, Agent, or Firm* — Staas & Halsey LLP

(57) ABSTRACT

Embodiments of the present disclosure provide a sequence synchronization apparatus and method and a receiver. The sequence synchronization apparatus includes: a signal receiving unit configured to receive a clock synchronized signal including a training symbol, the training symbol being in-phase modulated or being modulated with a fixed phase difference based on all or part of subcarriers; and a symbol detecting unit configured to detect the training symbol, so as to achieve sequence synchronization of the signal. With the embodiments of the present disclosure, not only sequence synchronization may be achieved by using minimum complexity as possible, but also the sequence synchronization apparatus is made simple, fast and accurate.

12 Claims, 7 Drawing Sheets

1201 receiving a clock synchronized signal comprising a training symbol, the training symbol being in-phase modulated or being modulated with a fixed phase difference based on all or part of subcarriers

1202 detecting the training symbol, so as to achieve sequence synchronization of the signal

SEQUENCE SYNCHRONIZATION APPARATUS AND METHOD AND RECEIVER

CROSS REFERENCE TO RELATED APPLICATIONS

This application claims the benefit of Chinese Application No. 201310469795.6, filed Oct. 10, 2013, the disclosure of which is incorporated herein by reference.

BACKGROUND OF THE INVENTION

1. Technical Field

The present disclosure relates to the field of communications, and in particular to a sequence synchronization apparatus and method and a receiver.

2. Background

As the continuous increase of the demand for communication rates, numerous researches and applications are focused on multicarrier communication systems, such as discrete multi-tone (DMT), and orthogonal frequency division multiplexing (OFDM), etc.

FIG. 1 is a block diagram of a receiver of a multicarrier communication system. As shown in FIG. 1, sequence synchronization is after clock synchronization, and is a necessary step before signal demodulation. Sequence synchronization is to synchronize signal sequences of a receiving side and a transmitting side, and is a necessary condition for achieving coordinated operation of a transmitter and a receiver. Generally speaking, sequence synchronization of a multicarrier communication system is mainly based on correlation operation and wave crest decision.

FIG. 2 is a schematic diagram of sequence synchronization in the prior art, showing a sequence synchronization apparatus based on correlation operation. As shown in FIG. 2, a local correlation sequence is prestored in a receiving side; after several specific or repeated symbol sequences are generated and sent out by a transmitter and signals are received by the receiving side and clock synchronized, correlation operation is performed by a correlation operation unit to an input signal sequence and the local correlation sequence, and then a wave crest detecting circuit is used to detect crests of correlation values for correlation value sequences, so as to obtain a sequence synchronization signal. An advantage of such a method is that it is good in accuracy.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

However, the inventors found that in the above prior art, first, the local correlation sequence needs to occupy a storage space; and second, the complexity of the correlation operation is high, and is limited by the operation rate. Especially for a high-rate communication system (such as 100 Gb/s), all delay, cost and power consumption of correlation operation of a long sequence performed within a single symbol are important constraint factors. Although the complexity may be partly lowered by shortening or optimizing a correlation sequence length, the operation rate is still insufficient, and it will be resulted in that an error probability of wave crest detection becomes high and accuracy of sequence synchronization is lowered.

Embodiments of the present disclosure provide a sequence synchronization apparatus and method and a receiver, with an object being to achieve sequence synchronization by using minimum complexity as possible, and make the sequence synchronization apparatus simple, fast and accurate.

According to one aspect of the embodiments of the present disclosure, there is provided a sequence synchronization apparatus, including:

a signal receiving unit, configured to receive a clock synchronized signal including a training symbol, the training symbol being in-phase modulated or being modulated with a fixed phase difference based on all or part of subcarriers; and a symbol detecting unit, configured to detect the training symbol, so as to achieve sequence synchronization of the signal.

According to another aspect of the embodiments of the present disclosure, there is provided a sequence synchronization method, including:

receiving a clock synchronized signal including a training symbol, the training symbol being in-phase modulated or being modulated with a fixed phase difference based on all or part of subcarriers; and detecting the training symbol, so as to achieve sequence synchronization of the signal.

According to still another aspect of the embodiments of the present disclosure, there is provided a receiver, including:

a clock synchronization unit, configured to receive a signal including a training symbol transmitted by a transmitter and perform clock synchronization on the signal, the training symbol being in-phase modulated or being modulated with a fixed phase difference based on all or part of subcarriers;

a sequence synchronization unit, configured to receive the clock synchronized signal and detect the training symbol, so as to achieve sequence synchronization of the signal;

a signal demodulating unit, configured to demodulate the sequence synchronized signal; and a decoding unit, configured to decode the demodulated signal.

According to still another aspect of the embodiments of the present disclosure, there is provided a multicarrier communication system, including:

a transmitter, configured to transmit a signal including a training symbol, the training symbol being in-phase modulated or being modulated with a fixed phase difference based on all or part of subcarriers; and a receiver, configured to receive the signal including the training symbol transmitted by the transmitter, detect the training symbol after clock synchronizing the signal to achieve sequence synchronization of the signal, and demodulate and decode the signal.

An advantage of the embodiments of the present disclosure resides in that by detecting the training symbol in-phase modulated or modulated with a fixed phase difference based on all or part of subcarriers, not only sequence synchronization may be achieved by using minimum complexity as possible, but also the sequence synchronization apparatus is made simple, fast and accurate.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/comprises" when used in this specification is taken to specify the presence of stated features, integers, steps or components but does not preclude the presence or addition of one or more other features, integers, steps, components or groups thereof.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

Figure 1:
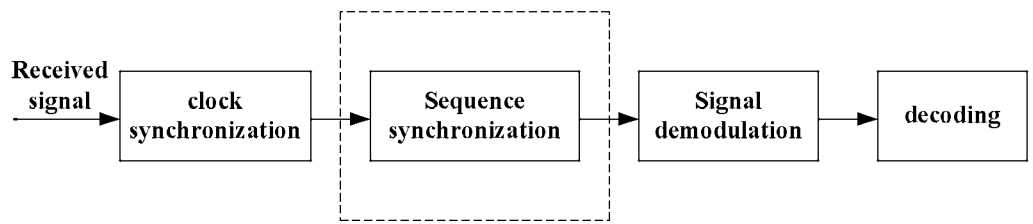
FIG. 1 is a block diagram of a receiver of a multicarrier communication system.
Figure 2:
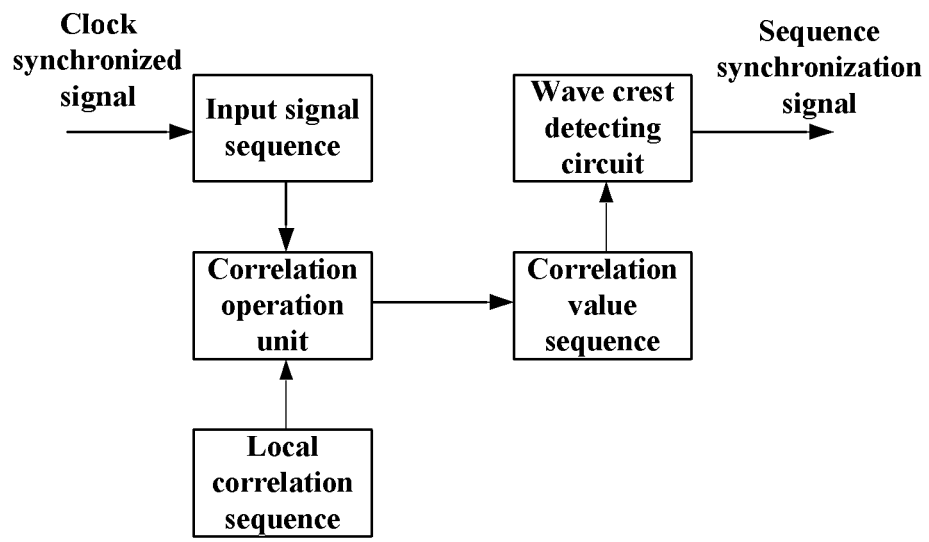
FIG. 2 is a schematic diagram of sequence synchronization in the prior art.
Figure 3:
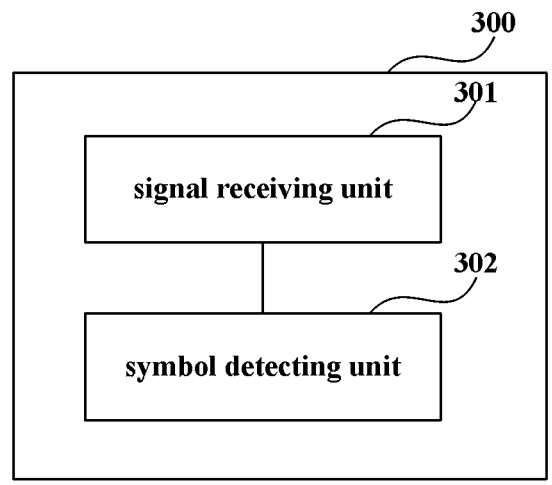
FIG. 3 is a schematic diagram of the structure of a sequence synchronization apparatus of an embodiment of the present disclosure.

An embodiment of the present disclosure provides a sequence synchronization apparatus, and FIG. 3 is a schematic diagram of the structure of the sequence synchronization apparatus of the embodiment of the present disclosure. As shown in FIG. 3, the sequence synchronization apparatus 300 includes a signal receiving unit 301 and a symbol detecting unit 302;

wherein, the signal receiving unit 301 is configured to receive a clock synchronized signal including a training symbol, the training symbol being in-phase modulated or being modulated with a fixed phase difference based on all or part of subcarriers; and the symbol detecting unit 302 is configured to detect the training symbol, so as to achieve sequence synchronization of the signal.

In this embodiment, the training symbol may be added into the signal at a transmitter side. The training symbol may be of characteristics modulated by using multiple carriers respectively, so that part or all of its subcarriers have the same phases, or it may be modulated with a fixed phase difference, with distribution of time domain power of a waveform of the symbol being different from that of other data, which may be used for detection.

Figure 4:
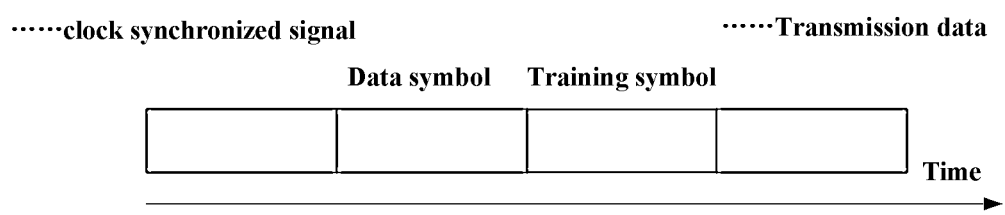
FIG. 4 is a schematic diagram of a training symbol configured for sequence synchronization of an embodiment of the present disclosure.

For example, a DMT modulation system is taken as an example, and FIG. 4 is a schematic diagram of a training symbol configured for sequence synchronization. Assuming that a phase of all the subcarriers is $\phi$, and the number of the subcarriers is SC, inverse discrete Fourier transform (IDFT) before a cyclic prefix (CP) is added into the training symbol in such a case may be:

$$x(n) = \begin{cases} 2\pi f_0 \cos\phi, & n = 1 \\ 0, & \begin{array}{l} n \text{ is an odd number} \\ \text{and } n \neq 1 \end{array} \\ -2f_0 \sin\phi / [\pi(n-1)], & n \text{ is an even number} \end{cases}, n \in [1, SC*2]; \quad (1)$$

where, $2f_0$ is a sampling rate, and power of each subcarrier is 1. Due to periodical extension of inverse fast Fourier transform (IFFT) of actual sampling, a waveform formula before actually adding the CP may be:

$$x(n) = \begin{cases} 2\pi f_0 \cos\phi, & n = 1 \\ 0, & \begin{array}{l} n \text{ is an odd number} \\ \text{and } n \neq 1 \end{array} \\ -2f_0 \sin\phi / [\pi(n-1)], & \begin{array}{l} n \text{ is an even number} \\ \text{and } n \text{ is less than } SC \end{array} \\ -2f_0 \sin\phi / [\pi(n - SC*2 - 1)], & \begin{array}{l} n \text{ is an even number} \\ \text{and } n \text{ is greater than } SC \end{array} \end{cases} \quad (2)$$

$$n \in [1, SC*2].$$

It can be seen that the power of the training symbol is mainly concentrated at a boundary moment of the waveform, and signal power at an intermediate moment is very small, while power of other transmitted data symbols is almost identical at all the moments. Such a characteristic still exists after the CP is added. For example, assuming SC 512 and CP 32 of the DMT system, each symbol has 1056 sampling points, the amplitude-limiting wave crest factor of the transmitter is 3.16, and phase $\phi$ of all the subcarriers of f the training symbol is 0.

Figure 5:
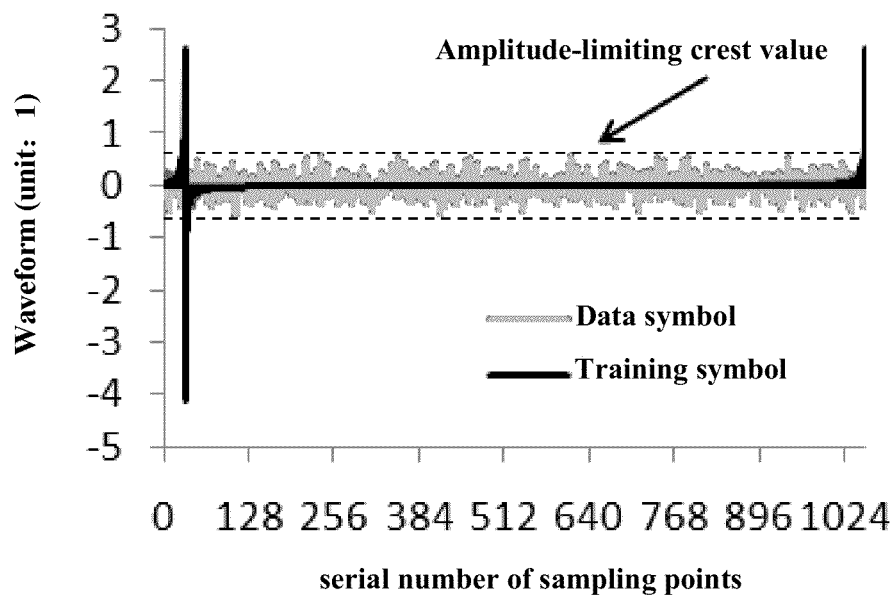
FIG. 5 is a schematic diagram of waveforms of the training symbol and other symbols of an embodiment of the present disclosure.

FIG. 5 is a schematic diagram of waveforms of the training symbol and other symbols of an embodiment of the present disclosure, showing comparison waveforms of a data symbol and a training symbol. As shown in FIG. 5, distribution of time domain power of the waveform of the training symbol is different from those of the data symbols, hence, the training symbol may be used in detecting for sequence synchronization.

It should be noted that the above formulae and the like are illustrative explanation of the in-phase modulated training symbol; however, the present disclosure is not limited thereto. For example, a training symbol may be obtained through modulation with a fixed phase difference. And the above formulae and the like are illustrative explanation of the training symbol obtained by modulating all the subcarriers; however, the present disclosure is not limited thereto. For example, a training symbol may be obtained by modulating part of the subcarriers. Furthermore, the training symbol may be one, and may also be multiple that are periodically or aperiodically added, and a particular mode of implementation may be determined according to an actual situation.

In this embodiment, the training symbol may be detected at a receiver side based on an amplitude-related value; wherein, the amplitude-related value may be power, or an absolute value of magnitude, or other quantities obtained by amplitude calculation. For example, sequence synchronization may be performed based on a detection method of judgment of power or an average value of amplitudes. However, the present disclosure is not limited thereto, and the amplitude-related value may be calculated according to an actual situation. The relevant art may be referred to for how to calculate an amplitude-related value.

Therefore, the sequence synchronization apparatus based on a special training symbol is simple, fast and accurate, and sequence synchronization is realized by using minimum complexity as possible.

Figure 6:
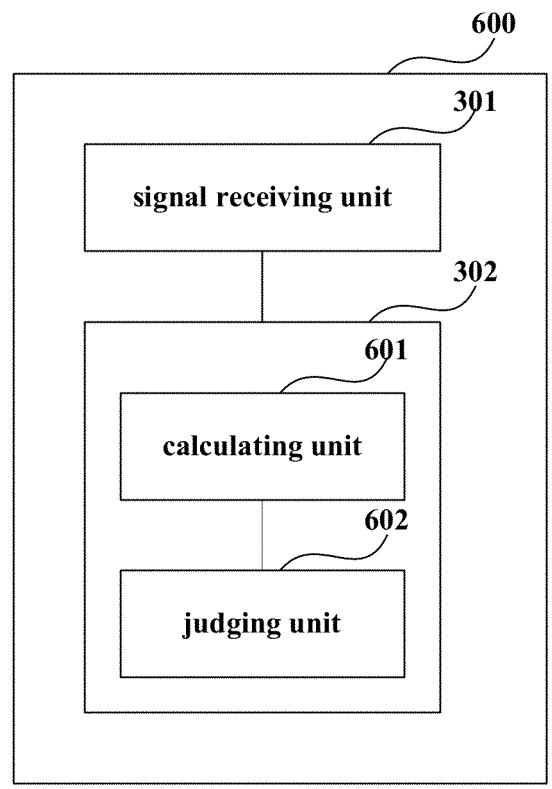
FIG. 6 is another schematic diagram of the structure of the sequence synchronization apparatus of the embodiment of the present disclosure.

In a mode of implementation, the sequence synchronization may be detected by monitoring whole symbol power of a clock synchronization signal in a receiver. FIG. 6 is another schematic diagram of the structure of the sequence synchronization apparatus of the embodiment of the present disclosure. As shown in FIG. 6, the sequence synchronization apparatus 600 includes a signal receiving unit 301 and a symbol detecting unit 302, as described above.

As shown in FIG. 6, the symbol detecting unit 302 may include a calculating unit 601 and a judging unit 602; wherein, the calculating unit 601 is configured to calculate power or an absolute value of magnitude or other quantities obtained by amplitude calculation for a symbol in the signal, and the judging unit 602 is configured to compare the power or the absolute value of magnitude or the other quantities obtained by amplitude calculation of the symbol with a predefined threshold value, and judge whether the symbol is the training symbol according to a result of comparison.

In particular implementation, detection may be performed symbol by symbol. Symbols of the signal are detected one by one, and the sequence synchronization may be achieved according to the result of judgment of the judging unit 602; wherein, the predefined threshold value may be predefined according to an empirical value, and may also be obtained through calculation.

Figure 7:
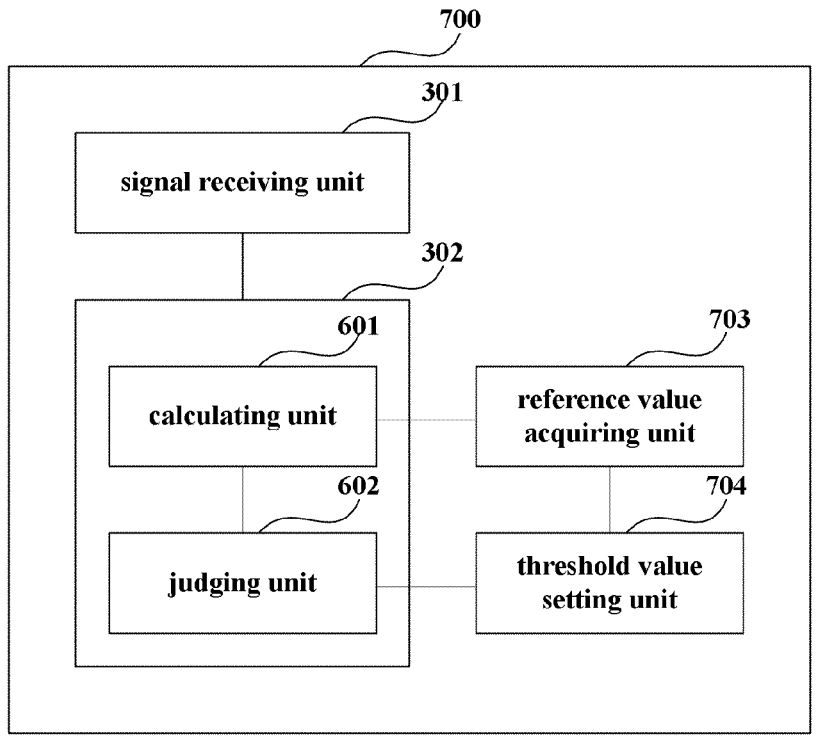
FIG. 7 is a further schematic diagram of the structure of the sequence synchronization apparatus of the embodiment of the present disclosure.

FIG. 7 is a further schematic diagram of the structure of the sequence synchronization apparatus of the embodiment of the present disclosure. As shown in FIG. 7, the sequence synchronization apparatus 700 includes a signal receiving unit 301 and a symbol detecting unit 302, the symbol detecting unit 302 including a calculating unit 601 and a judging unit 602, as described above.

As shown in FIG. 7, the sequence synchronization apparatus 700 may further include a reference value acquiring unit 703 and a threshold value setting unit 704; wherein, the reference value acquiring unit 703 is configured to average the power or absolute values of magnitude or other quantities obtained by amplitude calculation for multiple symbols of the signal, so as to obtain a reference value; and the threshold value setting unit 704 is configured to determine the predefined threshold value according to the reference value and information on amplitude limiting of a transmitter.

In this mode of implementation, amplitude limiting processing is often performed at the transmitter side of the multicarrier system. As shown in FIG. 4, the amplitude limiting processing may generate a large amount of attenuation to the power of the training symbol, and have little effect on power of the transmitted data symbols. Such a symbol power difference may be detected at the receiver side, thereby finding the sequence synchronization. Furthermore, the power calculation may be replaced by absolute value of magnitude calculation, so as to lower the complexity of the calculation.

In this mode of implementation, after the clock synchronization, the calculating unit 3021 of the receiver side may calculate power or absolute values of magnitude or other quantities obtained by amplitude calculation for symbols coming one after another. The reference value acquiring unit 703 may average the power or the absolute values of magnitude or the other quantities obtained by amplitude calculation obtained through N (N is a positive integer greater than 1) times of calculation, the basis for selecting N being to obtain a stable reference value; and the threshold value setting unit 704 may determine an appropriate threshold value according to the obtained reference value and attenuation brought by the amplitude limiting of the transmitter to the power of the training symbol.

And then the calculating unit 3021 may calculate power or absolute values of magnitude or other quantities obtained by amplitude calculation for symbols coming one after another, and the judging unit 3022 may judge whether the symbol is the training symbol according to the result of comparison of the power or the absolute values of magnitude or the other quantities obtained by amplitude calculation of each symbol with the threshold value determined by the threshold value setting unit 704.

In this mode of implementation, an initial threshold value determined by the threshold value setting unit 704 may be set sufficiently large, so as to ensure that wrong synchronization indication will not occur before a stable threshold value is determined When a judged quantity is the absolute value of magnitude, the complexity of calculation of each symbol in such a method is complexity of averaging and moduling for orders of magnitude of the subcarriers; and when a judged quantity is the power, complexity of multiplication for orders of magnitude of the subcarriers will be extra added.

Figure 8:
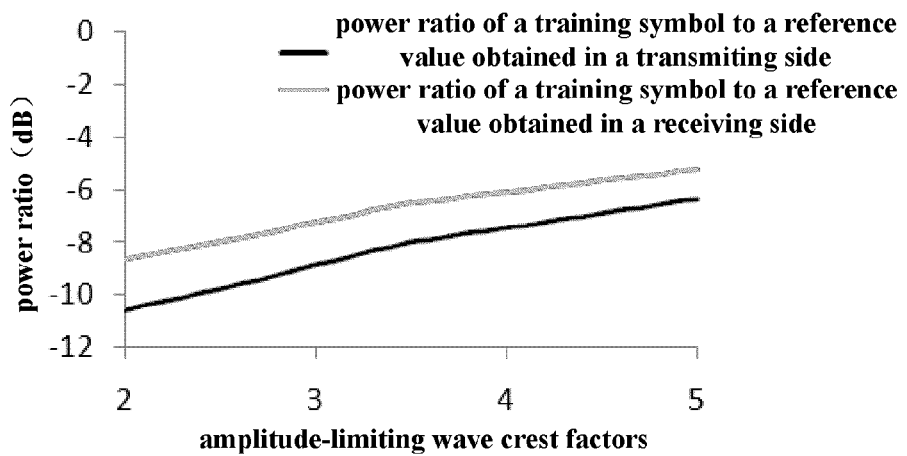
FIG. 8 is a schematic diagram of a power ratio of a training symbol obtained by a transmitter and a receiver to a reference value in a case of different amplitude-limiting wave crest factors of the embodiment of the present disclosure.

Taking the above-described DMT system as an example, and taking N=100. FIG. 8 is a schematic diagram of a power ratio of a training symbol obtained by a transmitter and a receiver to a reference value in a case of different amplitude-limiting wave crest factors; wherein, the amplitude-limiting wave crest factors may be fixed values of the system. When a wave crest factor is 3.16, the power of the training symbol after amplitude limiting is less than the reference value by 8.69 dB, and the difference at the receiver side changes into 7.09 dB due to an effect of a noise, hence, the threshold value may be selected as being less than the reference value by 4 dB. The smaller the amplitude-limiting wave crest factors, the larger power attenuation to the training symbol, and the easier to be detected.

Figure 9:
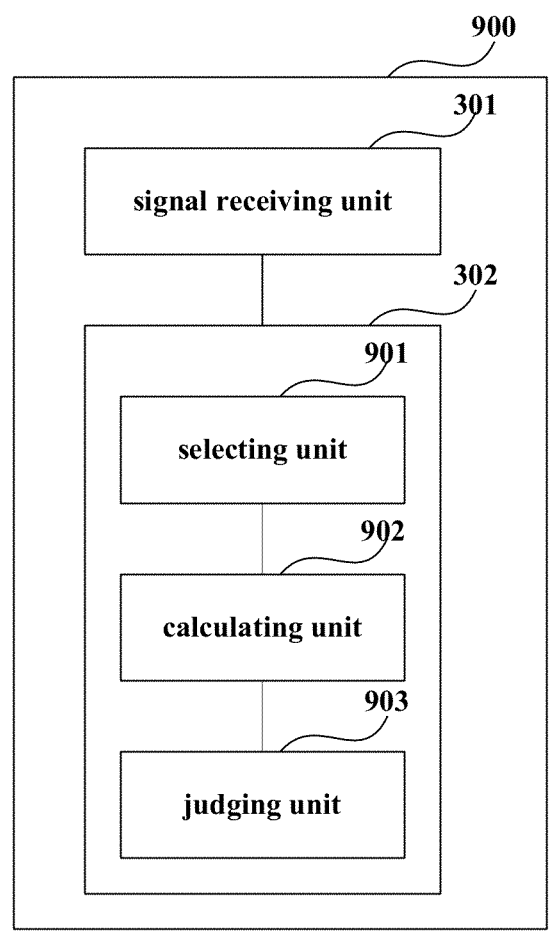
FIG. 9 is still another schematic diagram of the structure of the sequence synchronization apparatus of the embodiment of the present disclosure.

In another mode of implementation, sequence synchronization is detected by monitoring power of a part of special sampling points of a symbol of a clock synchronization signal in the receiver. FIG. 9 is still another schematic diagram of the structure of the sequence synchronization apparatus of the embodiment of the present disclosure. As shown in FIG. 9, the sequence synchronization apparatus 900 includes a signal receiving unit 301 and a symbol detecting unit 302, as described above.

As shown in FIG. 9, the symbol detecting unit 302 may include a selecting unit 901, a calculating unit 902 and a judging unit 903; wherein, the selecting unit 901 is configured to select multiple sampling points for a symbol in the signal; the calculating unit 902 is configured to calculate power or an absolute value of magnitude or other quantities obtained by amplitude calculation of the symbol, and the judging unit 903 is configured to compare the power or the absolute value of magnitude or the other quantities obtained by amplitude calculation of the symbol with a predefined threshold value, and judge whether the symbol is the training symbol according to a result of comparison.

In particular implementation, detection may be performed symbol by symbol. Symbols of the signal are detected one by one, and the sequence synchronization may be achieved according to the result of judgment of the judging unit 903; wherein, the predefined threshold value may be predefined according to an empirical value, and may also be obtained through calculation.

Figure 10:
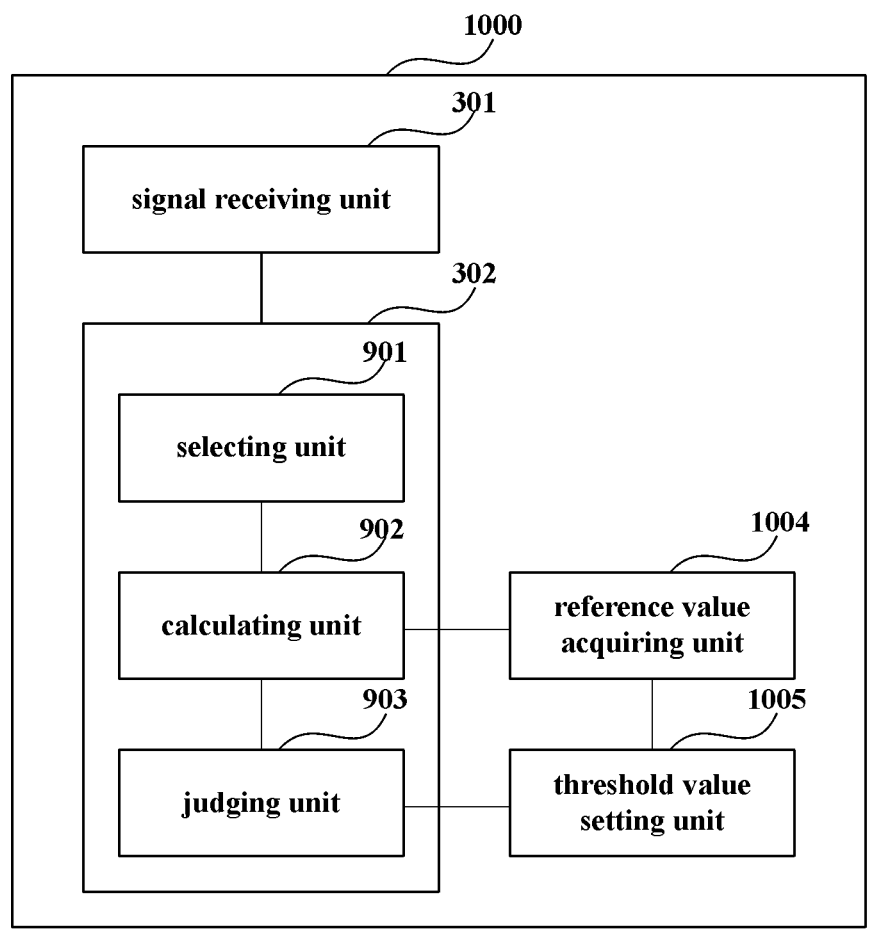
FIG. 10 is yet another schematic diagram of the structure of the sequence synchronization apparatus of the embodiment of the present disclosure.

FIG. 10 is yet another schematic diagram of the structure of the sequence synchronization apparatus of the embodiment of the present disclosure. As shown in FIG. 10, the sequence synchronization apparatus 1000 includes a signal receiving unit 301 and a symbol detecting unit 302, the symbol detecting unit 302 including a selecting unit 901, a calculating unit 902 and a judging unit 903, as described above.

As shown in FIG. 10, the sequence synchronization apparatus 1000 may further include a reference value acquiring unit 1004 and a threshold value setting unit 1005; wherein, the reference value acquiring unit 1004 is configured to average power or absolute values of magnitude or other quantities obtained by amplitude calculation for multiple symbols of the signal, so as to obtain a reference value; and the threshold value setting unit 1005 is configured to determine the predefined threshold value according to the reference value and information on amplitude limiting of a transmitter.

In this mode of implementation, if the training symbol is in-phase modulated, a difference between the training symbol and the transmitted data is comparatively large at an intermediate moment of a waveform. And as a length of an effective memory of a channel is limited and a waveform of a boundary moment of each symbol is hard to have an effect on the intermediate moment, such a power difference is only subjected to an effect of a noise and still exists at the receiver side, which may be used for detection of a training symbol. Furthermore, the power calculation may be replaced by absolute value of magnitude calculation, so as to lower the complexity of the calculation.

In this mode of implementation, after the clock synchronization, the calculating unit 902 may take only M (M is a positive integer greater than 1) intermediate sampling points of symbols coming one after another, the basis for selecting M being to obtain a stable calculated value of a single symbol; and the calculating unit 902 may calculate power or absolute values of magnitude or other quantities obtained by amplitude calculation for the M selected sampling points. The reference value acquiring unit 1004 may average the power or the absolute values of magnitude or the other quantities obtained by amplitude calculation obtained through N times of calculation, the basis for selecting N being to obtain a stable reference value. And the threshold value setting unit 1005 may determine an appropriate threshold value according to the obtained reference value and attenuation brought by the amplitude limiting of the transmitter to the power of the training symbol.

And then the calculating unit 902 may calculate power or absolute values of magnitude or other quantities obtained by amplitude calculation for symbols coming one after another, and the judging unit 903 may judge whether the symbol is the training symbol according to the result of comparison of the power or the absolute value of magnitude or the other quantities obtained by amplitude calculation of each symbol with the threshold value determined by the threshold value setting unit 1005.

In this mode of implementation, when a judged quantity is the absolute value of magnitude, the complexity of calculation of each symbol in such a method is complexity of averaging and modulating of M; and when a judged quantity is the power, complexity of M pieces of multiplication will be extra added.

Figure 11:
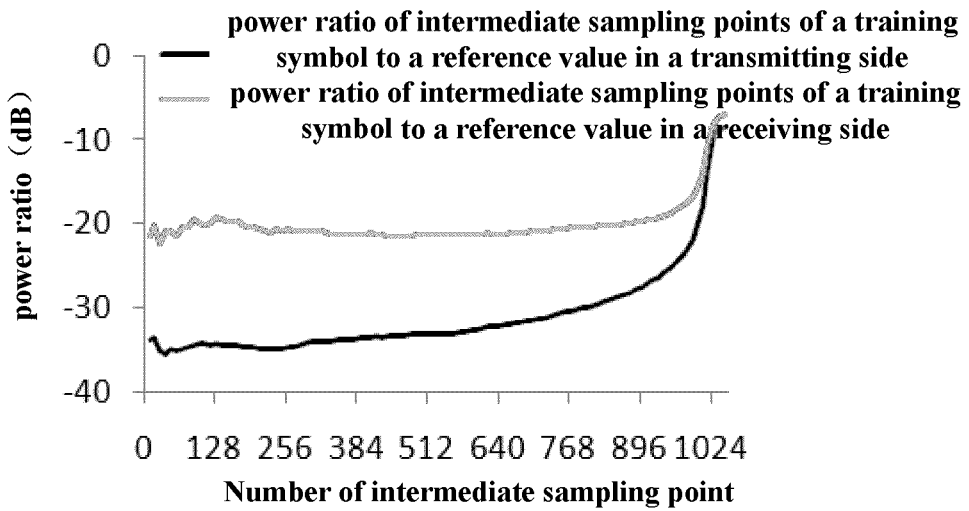
FIG. 11 is a schematic diagram of a power ratio of an intermediate sampling point of a training symbol obtained by a transmitter and a receiver to a reference value of an embodiment of the present disclosure.

The above-described DMT system is taken as an example. FIG. 11 is a schematic diagram of a power ratio of an intermediate sampling point of a training symbol obtained by a transmitter and a receiver to a reference value of an embodiment of the present disclosure, showing a power ratio of an intermediate sampling point of a training symbol obtained by a transmitter and a receiver to a reference value, which is subjected to the number of the intermediate sampling points.

When M=100, a training symbol at the transmitter side is less than the reference value by 32.15 dB, and the difference at the receiver side changes into 21.25 dB due to an effect of a noise, hence, the threshold value may be selected as being less than the reference value by 10 dB. The larger the M, the more the selected sampling points, and closer to a boundary, while the smaller a difference between a boundary training symbol and the reference value, the more difficult to be detected; hence, the smaller the M, the easier to be detected as the power difference is large, and the lower the complexity of the calculation. However, the M should not be too small, so as to necessarily ensure that there are sufficient points to make calculated power for transmitted data close to power of whole symbols, thereby avoiding wrong judgment.

It should be noted that the above description is given to taking M intermediate sampling points of a symbol. However, the present disclosure is not limited thereto. For example, when a training symbol is modulated by using a fixed phase difference, a power difference between the training symbol and the transmitted data may possibly be relatively large at other moments, hence, M un-intermediate sampling points of the symbol may be taken. A particular mode of implementation may be determined according to an actual situation.

It can be seen from the above embodiment that by detecting the training symbol which is in-phase modulated or modulated with a fixed phase difference based on all or part of subcarriers, not only sequence synchronization may be achieved by using minimum complexity as possible, but also the sequence synchronization apparatus is made simple, fast and accurate.

Embodiment 2

An embodiment of the present disclosure provides a sequence synchronization method, corresponding to the sequence synchronization apparatus of Embodiment 1, with the identical contents being not going to be described any further.

Figure 12:
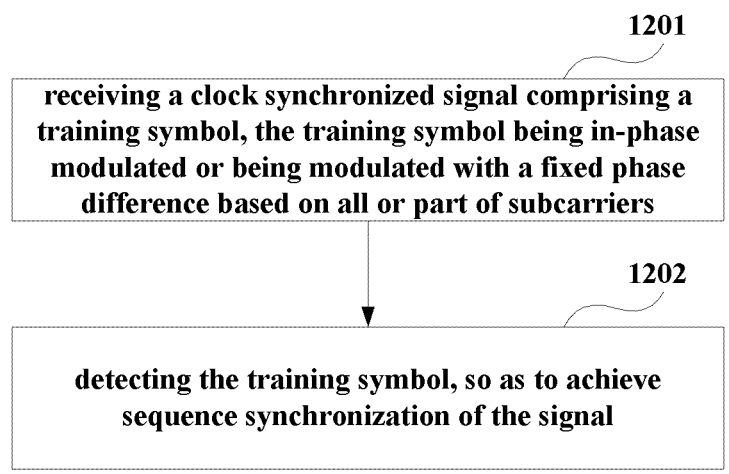
FIG. 12 is a flowchart of a sequence synchronization method of an embodiment of the present disclosure.

FIG. 12 is a flowchart of the sequence synchronization method of an embodiment of the present disclosure. As shown in FIG. 12, the sequence synchronization method includes:

step 1201: receiving a clock synchronized signal including a training symbol, the training symbol being in-phase modulated or being modulated with a fixed phase difference based on all or part of subcarriers; and step 1201: detecting the training symbol, so as to achieve sequence synchronization of the signal.

In a mode of implementation, the detecting the training symbol, so as to achieve sequence synchronization of the signal, includes: calculating power or an absolute value of magnitude or other quantities obtained by amplitude calculation for a symbol in the signal; and comparing the power or the absolute value of magnitude or the other quantities obtained by amplitude calculation of the symbol with a predefined threshold value, and judging whether the symbol is the training symbol according to a result of comparison.

In another mode of implementation, the detecting the training symbol, so as to achieve sequence synchronization of the signal, includes: selecting multiple sampling points for a symbol in the signal; calculating power or an absolute value of magnitude or other quantities obtained by amplitude calculation of the symbol according to the multiple sampling points; and comparing the power or the absolute value of magnitude or the other quantities obtained by amplitude calculation of the symbol with a predefined threshold value, and judging whether the symbol is the training symbol according to a result of comparison.

In this embodiment, the predefined threshold value may be predefined according to an empirical value, and may also be obtained through calculation. And the sequence synchronization method may further include: averaging the power or the absolute values of magnitude or the other quantities obtained by amplitude calculation for multiple symbols of the signal, so as to obtain a reference value; and determining the predefined threshold value according to the reference value and information on amplitude limiting of a transmitter.

It can be seen from the above embodiment that by detecting the training symbol which is in-phase modulated or modulated with a fixed phase difference based on all or part of subcarriers, not only sequence synchronization may be achieved by using minimum complexity as possible, but also the sequence synchronization apparatus is made simple, fast and accurate.

Embodiment 3

An embodiment of the present disclosure provides a receiver, including the sequence synchronization apparatus as described in Embodiment 1, with the identical contents being not going to be described any further.

In this embodiment, the receiver includes:

a clock synchronization unit configured to receive a signal including a training symbol transmitted by a transmitter and perform clock synchronization on the signal, the training symbol being in-phase modulated or being modulated with a fixed phase difference based on all or part of subcarriers;

a sequence synchronization unit configured to receive the clock synchronized signal and detect the training symbol, so as to achieve sequence synchronization of the signal;

a signal demodulating unit configured to demodulate the sequence synchronized signal; and a decoding unit configured to decode the demodulated signal.

An embodiment of the present disclosure further provides a multicarrier communication system, including:

a transmitter configured to transmit a signal including a training symbol, the training symbol being in-phase modulated or being modulated with a fixed phase difference based on all or part of subcarriers; and a receiver configured to receive the signal including the training symbol transmitted by the transmitter, detect the training symbol after clock synchronizing the signal to achieve sequence synchronization of the signal, and demodulate and decode the signal.

An embodiment of the present disclosure further provides a computer-readable program, wherein when the program is executed in a sequence synchronization apparatus, the program enables a computer to carry out the sequence synchronization method as described in Embodiment 2 in the sequence synchronization apparatus.

An embodiment of the present disclosure further provides a storage medium in which a computer-readable program is stored, wherein the computer-readable program enables a computer to carry out the sequence synchronization method as described in Embodiment 2 in a sequence synchronization apparatus.

The above apparatus and method of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

For the implementation of the present disclosure containing the above embodiments, following supplements are further disclosed.

Supplement 1. A sequence synchronization apparatus, including:

a signal receiving unit, configured to receive a clock synchronized signal including a training symbol, the training symbol being in-phase modulated or being modulated with a fixed phase difference based on all or part of subcarriers; and a symbol detecting unit, configured to detect the training symbol, so as to achieve sequence synchronization of the signal.

Supplement 2. The sequence synchronization apparatus according to supplement 1, wherein the symbol detecting unit includes:

a calculating unit, configured to calculate a value related to an amplitude for a symbol in the signal; and a judging unit, configured to compare the value related to the amplitude of the symbol with a predefined threshold value, and judge whether the symbol is the training symbol according to a result of comparison.

Supplement 3. The sequence synchronization apparatus according to supplement 1, wherein the symbol detecting unit includes a selecting unit, configured to select multiple sampling points for a symbol in the signal;

a calculating unit, configured to calculate a value related to an amplitude of the symbol according to the multiple sampling points; and a judging unit, configured to compare the value related to the amplitude of the symbol with a predefined threshold value, and judge whether the symbols is the training symbol according to a result of comparison.

Supplement 4. The sequence synchronization apparatus according to supplement 2 or 3, wherein the sequence synchronization apparatus further includes:

a reference value acquiring unit, configured to average the values related to amplitudes of multiple symbols of the signal, so as to obtain a reference value; and a threshold value setting unit, configured to determine the predefined threshold value according to the reference value and information on amplitude limiting of a transmitter.

Supplement 5. A sequence synchronization method, including:

receiving a clock synchronized signal including a training symbol, the training symbol being in-phase modulated or being modulated with a fixed phase difference based on all or part of subcarriers; and detecting the training symbol, so as to achieve sequence synchronization of the signal.

Supplement 6. The sequence synchronization method according to supplement 5, wherein the detecting the training symbol, so as to achieve sequence synchronization of the signal, includes:

calculating a value related to an amplitude for a symbol in the signal; and comparing the value related to the amplitude of the symbol with a predefined threshold value, and judging whether the symbol is the training symbol according to a result of comparison.

Supplement 7. The sequence synchronization method according to supplement 5, wherein the detecting the training symbol, so as to achieve sequence synchronization of the signal, includes:

selecting multiple sampling points for a symbol in the signal;

calculating a value related to an amplitude of the symbol according to the multiple sampling points; and comparing the value related to the amplitude of the symbol with a predefined threshold value, and judging whether the symbol is the training symbol according to a result of comparison.

Supplement 8. The sequence synchronization method according to supplement 6 or 7, wherein the sequence synchronization method further includes:

averaging the values related to amplitudes of multiple symbols of the signal, so as to obtain a reference value; and determining the predefined threshold value according to the reference value and information on amplitude limiting of a transmitter.

Supplement 9. A receiver, including:

a clock synchronization unit, configured to receive a signal including a training symbol transmitted by a transmitter and perform clock synchronization on the signal, the training symbol being in-phase modulated or being modulated with a fixed phase difference based on all or part of subcarriers;

a sequence synchronization unit, configured to receive the clock synchronized signal and detect the training symbol, so as to achieve sequence synchronization of the signal;

a signal demodulating unit, configured to demodulate the sequence synchronized signal; and a decoding unit, configured to decode the demodulated signal.

Supplement 10. The receiver according to supplement 9, wherein the sequence synchronization unit includes:

a signal receiving unit, configured to receive a clock synchronized signal including a training symbol, the training symbol being in-phase modulated or being modulated with a fixed phase difference based on all or part of subcarriers; and a symbol detecting unit, configured to detect the training symbol, so as to achieve sequence synchronization of the signal.

Supplement 11. The receiver according to supplement 10, wherein the symbol detecting unit includes:

a calculating unit, configured to calculate a value related to an amplitude for a symbol in the signal; and a judging unit, configured to compare the value related to the amplitude of the symbol with a predefined threshold value, and judge whether the symbol is the training symbol according to a result of comparison.

Supplement 12. The receiver according to supplement 10, wherein the symbol detecting unit includes:

a selecting unit, configured to select multiple sampling points for a symbol in the signal;

a calculating unit, configured to calculate a value related to an amplitude of the symbol according to the multiple sampling points; and a judging unit, configured to compare the value related to the amplitude of the symbol with a predefined threshold value, and judge whether the symbols is the training symbol according to a result of comparison.

Supplement 13. The receiver according to supplement 11 or 12, wherein the sequence synchronization unit further includes:

a reference value acquiring unit, configured to average the values related to amplitudes of multiple symbols of the signal, so as to obtain a reference value; and a threshold value setting unit, configured to determine the predefined threshold value according to the reference value and information on amplitude limiting of a transmitter.

Supplement 14. A multicarrier communication system, including:

a transmitter, configured to transmit a signal including a training symbol, the training symbol being in-phase modulated or being modulated with a fixed phase difference based on all or part of subcarriers; and a receiver, configured to receive the signal including the training symbol transmitted by the transmitter, detect the training symbol after clock synchronizing the signal to achieve sequence synchronization of the signal, and demodulate and decode the signal.

Supplement 15. A computer-readable program, wherein when the program is executed in a sequence synchronization apparatus, the program enables a computer to carry out the sequence synchronization method as described in any one of supplements 5-8 in the sequence synchronization apparatus.

Supplement 16. A storage medium in which a computer-readable program is stored, wherein the computer-readable program enables a computer to carry out the sequence synchronization method as described in any one of supplements 5-8 in a sequence synchronization apparatus.

The invention claimed is:

1. A sequence synchronization apparatus, comprising:
a signal receiving unit configured to receive a clock synchronized signal comprising a training symbol, the training symbol one of being in-phase modulated and being modulated with a fixed phase difference based subcarriers; and a symbol detecting unit configured to detect the training symbol to achieve sequence synchronization of the signal.

2. The apparatus according to claim 1, wherein the symbol detecting unit comprises:
a calculating unit configured to calculate a value related to an amplitude for a symbol in the signal; and
a judging unit configured to compare the value related to the amplitude for the symbol with a predefined threshold value, and determine whether the symbol is the training symbol according to a result of comparison.

3. The apparatus according to claim 2, wherein the sequence synchronization apparatus further comprises:
a reference value acquiring unit configured to average values related to amplitudes of multiple symbols of the signal to obtain a reference value; and
a threshold value setting unit configured to determine the predefined threshold value according to the reference value and information on amplitude limiting of a transmitter.

4. The apparatus according to claim 1, wherein the symbol detecting unit comprises:
a selecting unit configured to select multiple sampling points for a symbol in the signal;
a calculating unit configured to calculate a value related to an amplitude of the symbol according to the multiple sampling points; and
a judging unit configured to compare the value related to the amplitude of the symbol with a predefined threshold value, and determine whether the symbol is the training symbol according to a result of comparison.

5. The apparatus according to claim 4, wherein the sequence synchronization apparatus further comprises:
a reference value acquiring unit configured to average values related to amplitudes of multiple symbols of the signal to obtain a reference value; and
a threshold value setting unit configured to determine the predefined threshold value according to the reference value and information on amplitude limiting of a transmitter.

6. A sequence synchronization method, comprising:
receiving a clock synchronized signal comprising a training symbol, the training symbol one of being in-phase modulated and being modulated with a fixed phase difference based on subcarriers; and
detecting the training symbol to achieve sequence synchronization of the signal.

7. The sequence synchronization method according to claim 6, wherein the detecting the training symbol to achieve sequence synchronization of the signal, comprises:
calculating a value related to an amplitude for a symbol in the signal; and
comparing the value related to the amplitude of the symbol with a predefined threshold value, and determining whether the symbol is the training symbol according to a result of comparison.

8. The sequence synchronization method according to claim 7, wherein the sequence synchronization method further comprises:
averaging values related to amplitudes of multiple symbols of the signal to obtain a reference value; and
determining the predefined threshold value according to the reference value and information on amplitude limiting of a transmitter.

9. The sequence synchronization method according to claim 6, wherein the detecting the training symbol to achieve sequence synchronization of the signal, comprises:
selecting multiple sampling points for a symbol in the signal;
calculating a value related to an amplitude of the symbol according to the multiple sampling points; and
comparing the value related to the amplitude of the symbol with a predefined threshold value, and determining whether the symbol is the training symbol according to a result of comparison.

10. The sequence synchronization method according to claim 9, wherein the sequence synchronization method further comprises:
averaging values related to amplitudes of multiple symbols of the signal to obtain a reference value; and
determining the predefined threshold value according to the reference value and information on amplitude limiting of a transmitter.

11. A receiver, comprising:
a clock synchronization unit configured to receive a signal comprising a training symbol transmitted by a transmitter and perform clock synchronization on the signal, the training symbol one of being in-phase modulated and being modulated with a fixed phase difference based on subcarriers;
a sequence synchronization unit configured to receive the clock synchronized signal and detect the training symbol to achieve sequence synchronization of the signal;
a signal demodulating unit configured to demodulate the sequence synchronized signal; and
a decoding unit configured to decode the demodulated signal.

12. A multicarrier communication system, comprising:
a transmitter configured to transmit a signal comprising a training symbol, the training symbol one of being in-phase modulated and being modulated with a fixed phase difference based on subcarriers; and
a receiver configured to receive the signal comprising the training symbol transmitted by the transmitter, detect the training symbol after clock synchronizing the signal to achieve sequence synchronization of the signal, and demodulate and decode the signal.

* * * * *